United States Patent
Lin

(10) Patent No.: US 7,142,483 B2
(45) Date of Patent: Nov. 28, 2006

(54) OPTICAL STORAGE DRIVE WITH FUNCTIONS OF DETECTING TURN OVER

(75) Inventor: Jui-Chiang Lin, Taipei (TW)

(73) Assignee: Lite-On It Corporation, Taipei (TW)

( * ) Notice: Subject to any disclaimer, the term of this patent is extended or adjusted under 35 U.S.C. 154(b) by 383 days.

(21) Appl. No.: 10/710,339

(22) Filed: Jul. 2, 2004

(65) Prior Publication Data
US 2005/0185528 A1    Aug. 25, 2005

(30) Foreign Application Priority Data
Feb. 25, 2004    (TW) .............................. 93104835 A

(51) Int. Cl.
*G11B 7/00*    (2006.01)

(52) U.S. Cl. ................. 369/30.36; 369/44.14

(58) Field of Classification Search .................... None
See application file for complete search history.

(56) References Cited

U.S. PATENT DOCUMENTS 5,072,432 A * 12/1991 Tanaka .................... 369/13.19
2005/0105435 A1* 5/2005 Cookson et al. ......... 369/53.37

* cited by examiner

*Primary Examiner*—Muhammad Edun
(74) *Attorney, Agent, or Firm*—Winston Hsu

(57) ABSTRACT

An optical storage drive with functions of detecting turn over is disclosed. When it is detected that an optical storage drive is turned over, the power of the optical storage drive is turned off, or the operation of the optical storage drive is stopped, or the optical disc originally in the optical storage drive is ejected, or some warning reactions are generated so as to prevent a user that accidentally turns over an optical storage drive from operating the optical storage drive.

14 Claims, 7 Drawing Sheets

OPTICAL STORAGE DRIVE WITH FUNCTIONS OF DETECTING TURN OVER

BACKGROUND OF INVENTION

1. Field of the Invention

The present invention relates to an optical storage drive, and more particularly, to an optical storage drive with functions of detecting turn over.

2. Description of the Prior Art

As the population becomes better acquainted with computer devices, the number of applications of computer devices expands. Besides normal business use, personal computers can provide families with functions such as multimedia entertainment. Because multimedia entertainment often involves enormous audio streams and video streams for generating the needed optical and sound effects, the development of the data-storage technology of computer devices is promoted. Many different types of data-storage devices have appeared one by one for storing the digital data more easily. Among theses data-storage devices, optical disks have been a preferred tool in recent years because its low cost, small volume, and big capacity. Besides being able to store the data of normal documents or programs, optical discs are also widely used for storing multimedia data such as audio streams and video streams. To access the data stored in optical discs, an optical device has to be used.

The optical storage drive is an essential peripheral device of computer systems now. The optical storage drive is usually set up in the computer through in one of four ways. The first way, which is the most traditional way, is to have the front placed for horizontal use, the second way is to place the optical storage drive on its left-side for vertical use, the third way is to place the optical storage drive on its left-side for vertical use, and the fourth way is to have the front placed for vertical use. Please refer to FIG. 1, which is a diagram of the front placed for horizontal use of a prior art optical storage drive 10. The optical storage drive 10 comprises a housing 12, a power button 13, an insertion slot 14, a label 15, and a cover 16. The housing 12 is used for covering the whole optical storage drive 10 to protect the optical storage drive 10 from damage; the power button 13 is the power-on device of the optical storage drive 10; the insertion slot 14 is where the optical disc is inserted (as long as the optical disc is inserted in the insertion slot 14, the optical disc is pulled inside and placed into a specific position); and the label 15 here is for indicating the top of the optical storage drive 10. In addition, other buttons used for controlling the optical storage drive 10 can be set up on the cover 16, and these buttons ordinarily are protected by the cover 16 to avoid being pressed accidentally. Additionally, the cover 16 should be open when using these buttons.

As shown in FIG. 1, the insertion slot 14 is set at the upper position of the optical storage drive 10, but the power button 13 and the cover 16 are set at the lower position of the optical storage drive 10. At this time, that the label 15 points above meaning that the top of the optical storage drive 10 points above. An optical disc has two sides. The bottom side is the side that data is read from; the top side is the side that is not read. For the optical storage drive 10 in FIG. 1, when inserting an optical disc in the insertion slot 14, the bottom side of the optical disc points to down so that the data of the optical disc can be read smoothly.

Please refer to FIG. 2, which is a diagram of the optical storage drive 10 in FIG. 1 placed on its left-side for vertical use. At this time, the label 15 faces the left, meaning that the optical storage drive 10 is placed on its left-side. Please refer to FIG. 3, which is a diagram of the optical storage drive 10 in FIG. 1 placed on its right-side for vertical use. At this time, the label 15 faces the right, meaning that the optical storage drive 10 is placed on its right-side. Please refer to the FIG. 4, which is a diagram of the optical storage drive 10 in FIG. 1 with the front placed for vertical use. At this time, the side that has the control buttons of the optical storage drive 10 (i.e. the side that has the insertion slot 14) points to above, the optical storage drive 10 is placed with its front facing above. The placement of an optical storage drive is often determined according to the position of the motherboard or the needs of external space, but the most important thing is that the optical storage drive can operate normally. Appropriate placement of the optical storage drive can efficiently save the space and make operation easier.

Because of the pickup head inside the optical storage drive and other mechanic structures, the optical storage drive can operate normally if the optical storage drive is placed in one of the four ways mentioned above. But if the optical storage drive is turned over, errors may happen when reading the data of the optical disc. Being "turned over" means that the optical storage drive 10 is placed on its top (i.e. the label 15 points to the bottom instead of above). At this time, when the whole optical storage drive 10 is turned over, the operation of the machine is seriously influenced because of gravity so that users cannot utilize the optical storage drive 10 to read the data of the optical disc smoothly.

SUMMARY OF INVENTION

It is therefore a primary objective of the claimed invention to provide an optical storage drive with functions of detecting being turned over. The optical storage drive comprises a housing; a detecting device mounted on the housing and used for sensing whether the housing is turned over; and a control device that is electrically connected to the detecting device and used for stopping the operation of the optical storage drive when the detecting device senses the housing being turned over.

DETAILED DESCRIPTION

Figure 1:
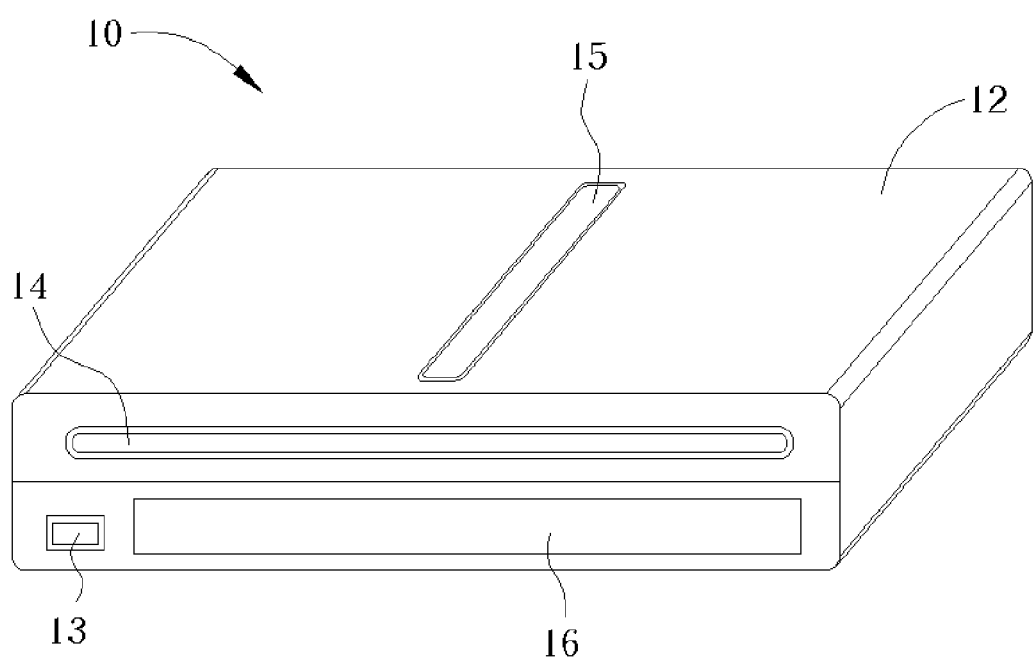
FIG. 1 is a diagram of the front placed for horizontal use of a prior art optical storage drive.
Figure 2:
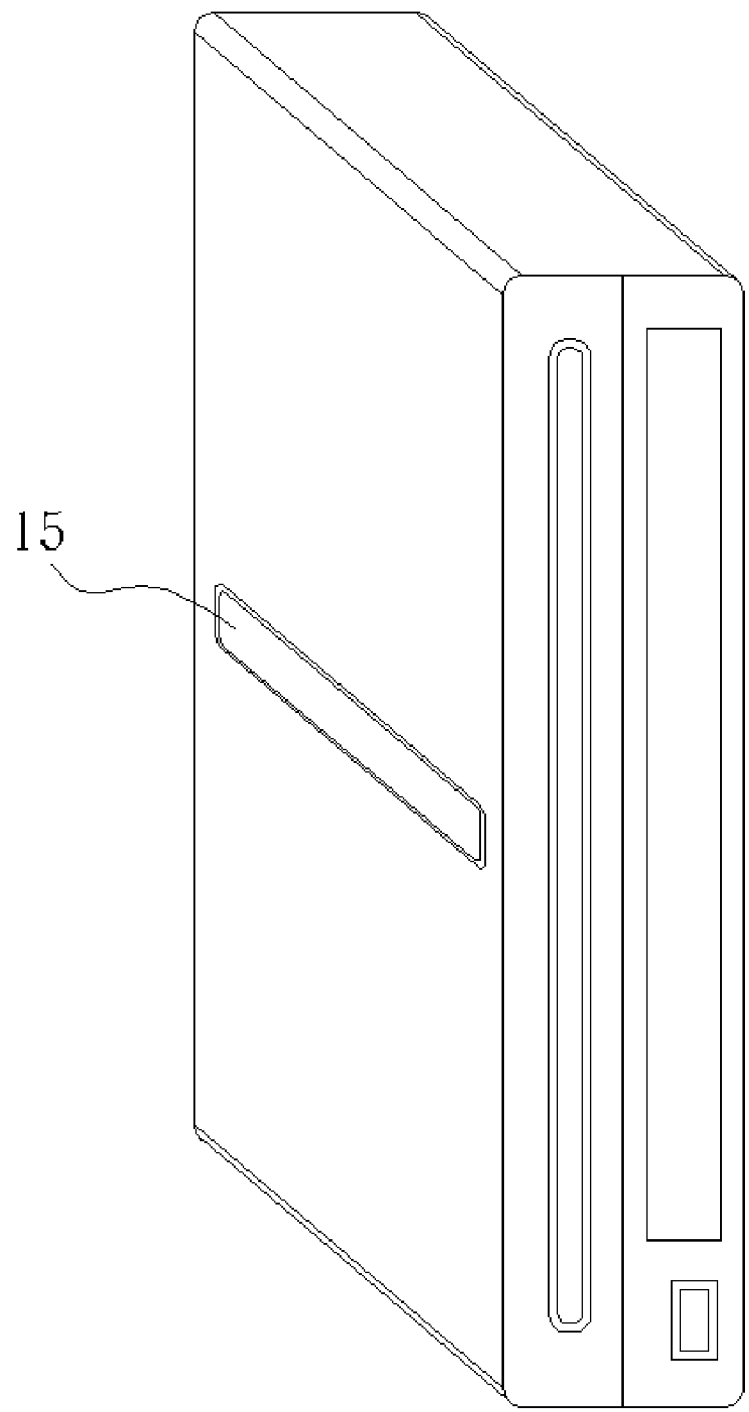
FIG. 2 is a diagram of the optical storage drive 10 in FIG. 1 placed on its left-side for vertical use.
Figure 3:
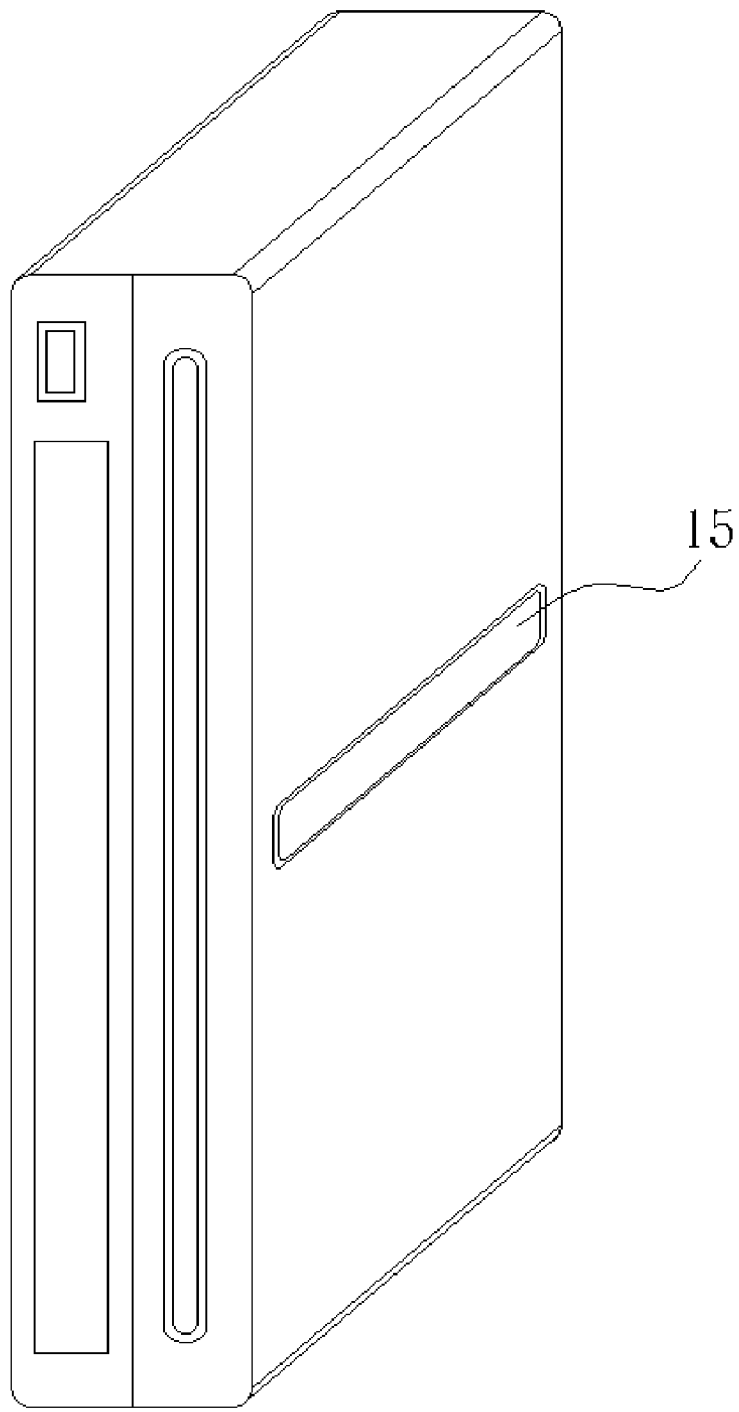
FIG. 3 is a diagram of the optical storage drive 10 in FIG. 1 placed on its right-side for vertical use.
Figure 4:
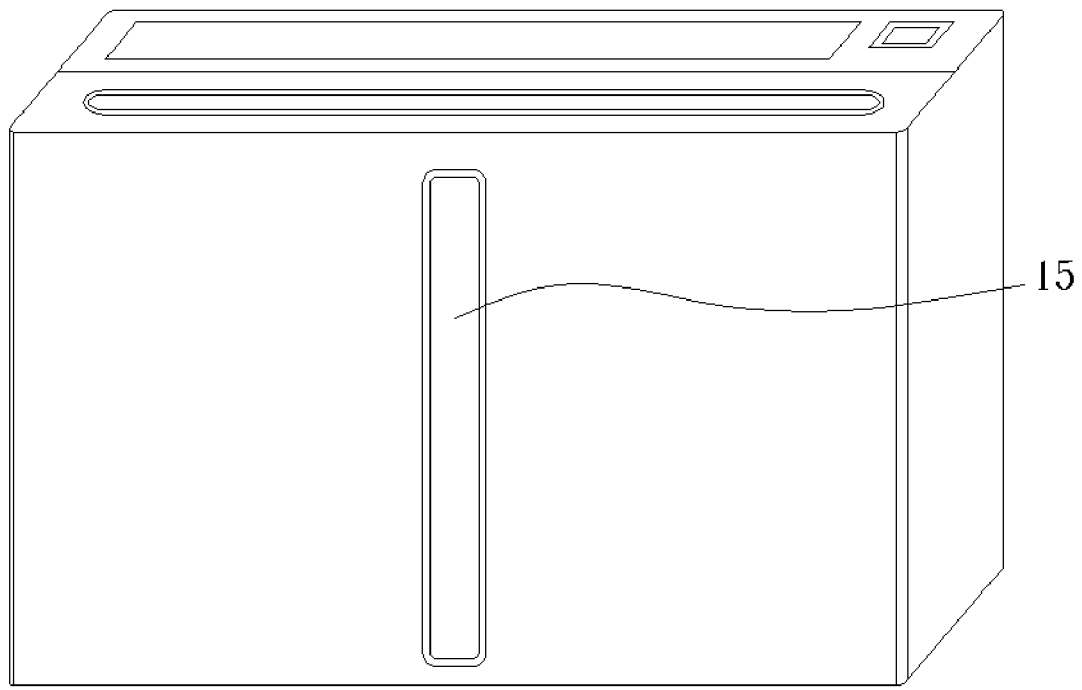
FIG. 4 is a diagram of the front placed for vertical use of the optical storage drive in FIG. 1.
Figure 5:
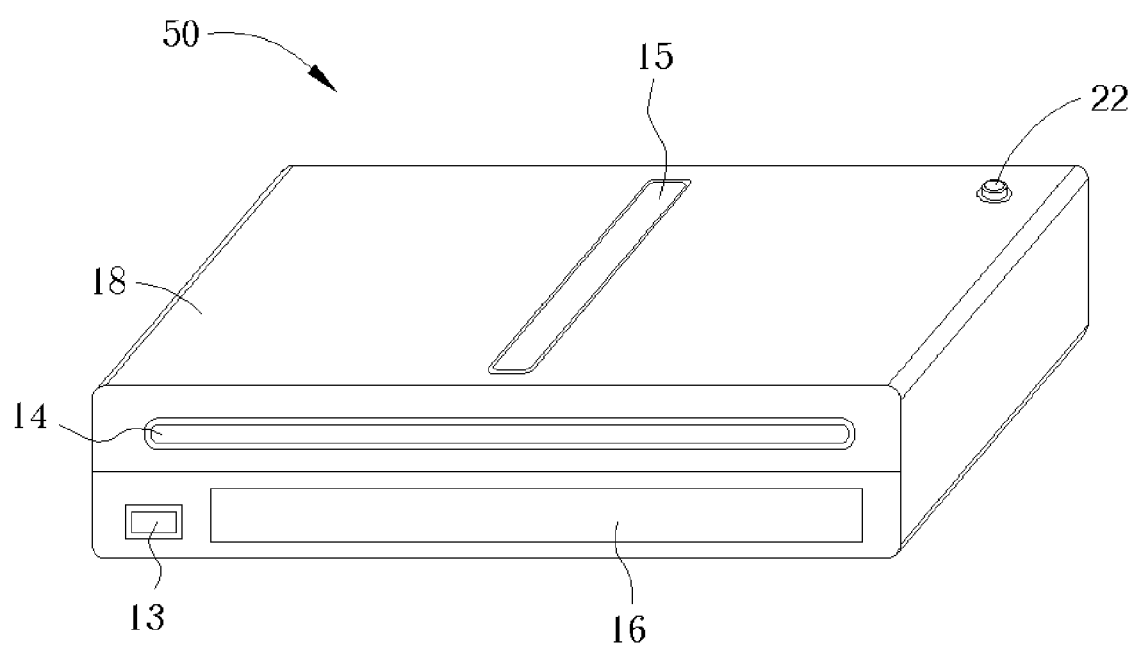
FIG. 5 is a diagram of the first embodiment of the optical storage drive with functions of detecting turn over according to the present invention.

Please refer to FIG. 5, which is a diagram of the first embodiment of the optical storage drive 50 with functions of detecting turn over according to the present invention. The optical storage drive 50 of the present invention comprises a turn-on switch 13, an insertion slot 14, a label 15 used for indicating the top of the optical storage drive 50, a housing 18, and a turned over button 22. The basic functions of optical storage drive 50, being the same as the functions of the prior art optical storage drive, accesses the data of the optical discs. In addition to the basic functions, the present invention optical storage drive 50 adds the function of preventing the optical storage drive from operating when turned over. The optical storage drive 50 is covered by the housing 18, and the turned over button 22 is set on the outside of the housing 18. The insertion slot 14 is used for accepting an inserted optical disc. The turn-on switch 13 controls the power of the optical storage drive 50. When the turn-on switch 13 is turned on, the power of the optical storage drive 50 is turned on and receives a control signal to execute operation. When the turn-on switch 13 is turned off, the power of the optical storage drive 50 is turned off, and operation ceases. The label 15 is not a necessary device of the optical storage drive in the present invention and is only used in the diagram for easily illustrating the placement of the optical storage drive.

The turned over button 22 is used for detecting whether the optical storage drive 50 is turned over. When the optical storage drive 50 is turned over on a plane (i.e. label 15 points to the surface of the plane), the turned over button 22 is pressed. The turned over button 22 generates a reaction when the turned over button 22 is pressed. There are many methods for generating reaction signals, such as utilizing mechanical theory or electrical theory. In the situation of utilizing mechanical theory, pressing the turned over button 22 drives the mechanical operations inside the optical storage drive 50. In the other situation of utilizing the electrical theory, pressing the turned over button 22 triggers an electrical signal to generate a reaction. The reaction in this embodiment is to stop the functional operation of the optical storage drive 50 so that users can no longer use the optical storage drive 50. Furthermore, the reaction can also comprise turning off the power of the optical storage drive 50 so that the optical storage drive 50 cannot execute the operation continuously to avoid errors of the read operation or the locking of the optical disc.

With regard to a slot-loading optical storage drive, a roller is set up inside the optical storage drive and is used for pulling the optical disc inside the housing of the optical storage drive when users insert the optical disc in the insertion slot. To illustrate easily, the roller of the slot-loading optical storage drive is used for controlling the optical disc in loading/ejecting. The reaction of the turned over button 22 can therefore be the stopping of the operation of the roller to prevent users from inserting the optical disc when the optical storage drive is turned over. Of course, the reaction of the pressed turned over button 22 can be other operations such as executing the ejection of the optical disc or generating a warning signal (such as a light signal or a sound signal) to warn users that the optical storage drive is turned over.

Figure 6:
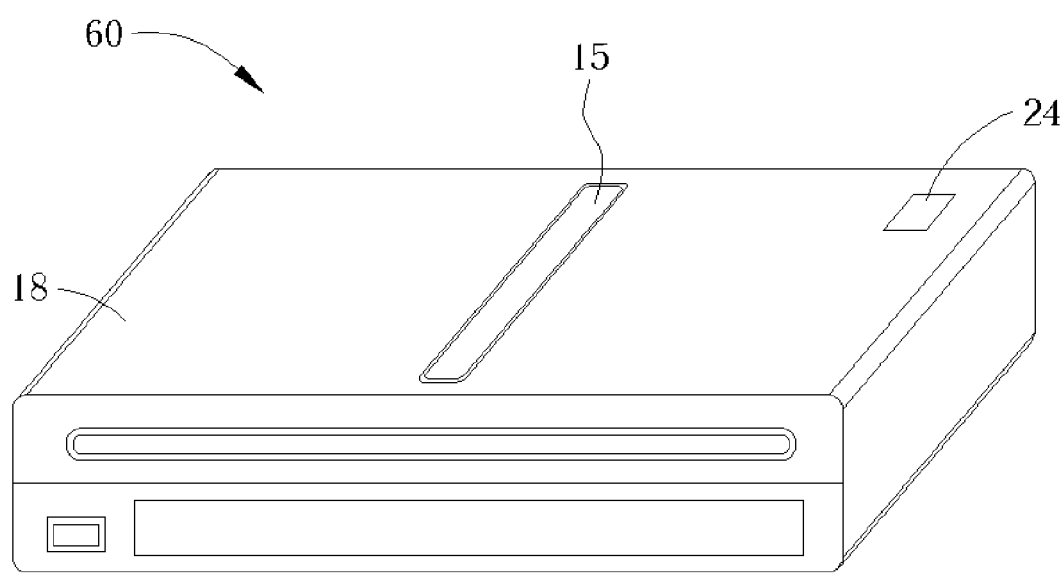
FIG. 6 is a diagram of the second embodiment of the optical storage drive with functions of detecting turn over according to the present invention.

FIG. 6 is a diagram of the second embodiment of the optical storage drive 50 with functions of detecting turn over according to the present invention. The optical storage drive 60 in FIG. 6 is approximately the same as the optical storage drive 50 in FIG. 5, but the turned over button 22 in FIG. 5 is replaced by a turned over device 24. The turned over device 24 is set up according to different situations such as inside the housing or on the housing. The turned over device 24 is used to detect whether the optical storage drive 60 is turned over. The turned over device 24 can be a pressure detector used for detecting a change in pressure, an optical detector used for detecting a change in light, a gravity detector used for detecting a change in the direction of gravity, or the like. When the label 15 points to the bottom (i.e. the optical storage drive 60 is turned over), with regard to a pressure detector as the turned over device 24, the optical storage drive 60 is turned over on a plane so that the pressure detector is triggered and detects a change in pressure. In regards to an optical detector as the turned over device 24, the optical detector can detect a change in light when the optical storage drive is turned over. Finally, with regards to a gravity detector as the turned over device 24, the gravity detector can be set up in the housing of the optical storage drive 60 and can detect a change in direction of gravity when the optical storage drive is turned over.

Figure 7:
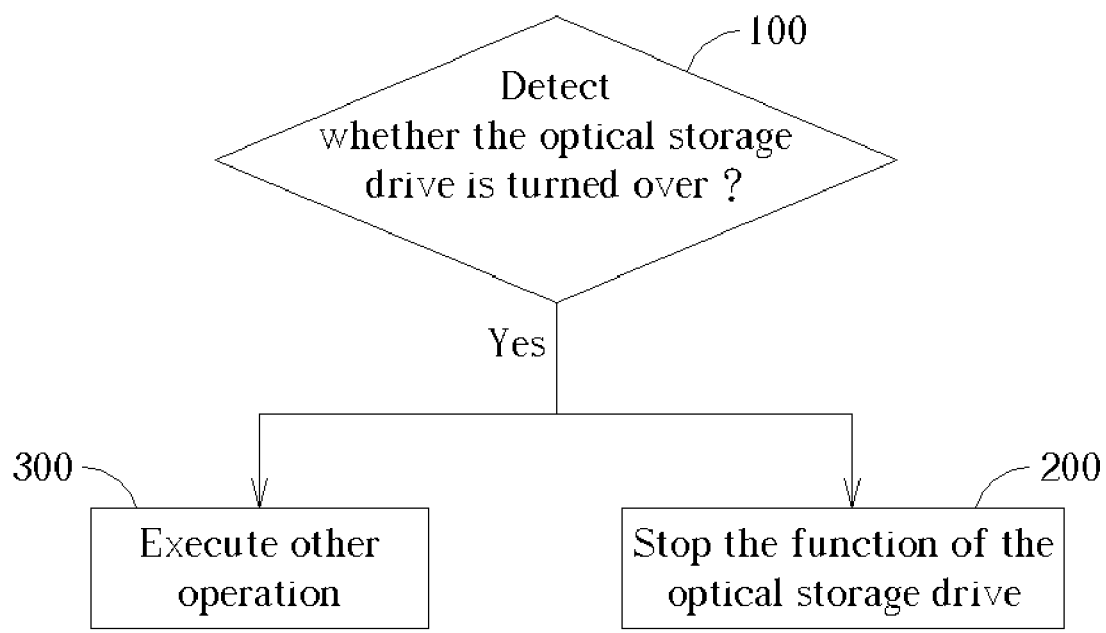
FIG. 7 is a flow chart of the method of detecting whether the optical storage drive is turned over according to the present invention.

Please refer to FIG. 7, which is a flow chart of the method of detecting whether the optical storage drive is turned over according to the present invention. The method comprises following steps:

Step 100: Detect whether the optical storage drive is turned over.

Step 200: Stop the operation of the optical storage drive.

Step 300: Execute other operation.

In a normal situation, if the optical storage drive is not turned over, the optical storage drive operates normally. At this time, if users insert an optical disc in the insertion slot, the slot-loading optical storage drive pulls in the optical disc, fixes the position of the optical disc, and prepares for read operation. If the optical storage drive is accidentally turned over, it can be detected in step 100. The execution of step 100 is then followed either by step 200 or step 300. In step 200, the operation of the optical storage drive is stopped in the situation of the optical storage drive being turned over. Stopping the operation of the optical storage drive also comprises turning off the power of the optical storage drive. One benefit is it notifies users that the optical storage drive is not positioned well; another benefit is it avoids unexpected results because the optical storage drive is turned over. The main purpose of step 300 "execute other operation" is to inform users that the optical storage drive is turned over.

The operation comprises:

1. With regard to a slot-loading optical storage drive, a roller inside the optical storage drive is used for pulling in an optical disc when users insert the optical disc in the insertion slot. During the insertion process, if the optical storage drive is turned over, the optical disc cannot be loaded inside the optical storage drive and therefore cannot be read.

2. Step 400 can generate a continuous, fragmental, or one warning sound for warning users that the optical storage drive is turned over and for requesting users to be careful.

3. Step 400 can light up a warning light for warning users that the optical storage drive is turned over and for requesting users to be careful.

4. Step 400 that can generate another kind of warning signals such as electrical signals.

The method of detecting the optical storage drive comprises:

1. utilizing the method of mechanical triggers: When the optical storage drive is turned over on a plane, a button on the optical storage drive is triggered, and the mechanical reaction of the button can be the detecting basis.

2. utilizing the method of pressure detecting: When the optical storage drive is turned over on a plane, the difference in the pressure of the touching surface between the optical storage drive and the plane is detected, and the change of pressure can be the detecting signal of being turned over.

3. utilizing the method of optical detecting: Normally, surrounding lights often shine from the top, a surface that points to the top may have more chance to receive more light. And oppositely, a surface that points to the bottom may receive less light. The change in light can be the basis of detecting turning over.

4. utilizing the method of gravity detecting: The direction of gravity and anti-gravity can be detected by some easy mechanism. The difference in gravity can apparently be detected when the optical storage drive is turned over. Even anti-gravity can also be used for detecting turn over.

The optical storage drive can be placed in a horizontally, vertically on its left-side, or vertically on its right-side. In these situations, the optical disc can be read smoothly with very few errors happening in each of the three placements mentioned above. But if the optical storage drive is turned over, optical discs may not be read or may be locked inside the optical storage drive because of the design of the read mechanism, and the fact that normal optical storage drives are not tested for being turned over. The prior art optical storage drive doesn't have the functions of detecting an optical storage drive being turned over. Therefore, when users accidentally turn over the optical storage drive, the problems mentioned above could happen or some unexpected operation happens. The optical storage drive according to the present invention has the function of detecting the optical storage drive being turned over and being able to prevent operation in the turned over state by adding a turning-over preventing device. The turned over device is used for detecting whether the optical storage drive is turned over. As long as the optical storage drive is turned over, the power of the optical storage drive is turned off so that users cannot use the optical storage drive, and a warning signal, sound, or light is generated for noticing users. In comparison with the prior art optical storage drive, the optical storage drive according to the present invention can make users use the optical storage drive more easily and has the advantages of easy use and safety.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An optical storage drive with functions of detecting being turned over comprising:
   a housing;
   a detecting device used for sensing whether the housing is turned over; and
   a control device that is electrically connected to the detecting device and used for stopping the operation of the optical storage drive when the detecting device senses the housing being turned over.

2. The optical storage drive of claim 1 wherein the control device is used for turning off the power of the optical storage drive when the housing is turned over.

3. The optical storage drive of claim 1 wherein the detecting device, being set up on the top of the housing, is a turned over button, which indicates the optical storage drive is turned over when the turned over button is pressed.

4. The optical storage drive of claim 1 further comprising:
   an insertion slot that is set up in the housing and used for accepting an inserted optical disc; and
   a roller that is set up inside the housing and used for pulling the optical disc that is inserted in the insertion slot into the housing.

5. The optical storage drive of claim 4 wherein the control device is used for stopping the operation of the roller of pulling the optical disc when the housing is turned over.

6. The optical storage drive of claim 1 wherein the detecting device comprises a pressure detector used for detecting a change in pressure.

7. The optical storage drive of claim 1 wherein the detecting device comprises an optical detector used for detecting a change in light.

8. The optical storage drive of claim 1 wherein the detecting device comprises a gravity detector used for detecting a change in gravity direction.

9. A method used for preventing an optical storage drive from operating when it is turned over comprising:
   (a) detecting whether a detecting device generates a reaction indicating the optical storage drive being turned over; and
   (b) stopping the operation of the optical storage drive when the reaction is detected.

10. The method of claim 9 wherein step (b) comprises turning off the power of the optical storage drive when the reaction is detected that the optical storage drive is turned over.

11. The method of claim 9 wherein step (b) comprises stopping the operation of pulling the optical disc with the roller of the optical storage drive when the reaction is detected that the optical storage drive is turned over.

12. The method of claim 9 wherein step (b) comprises executing the operation of ejecting the optical disc when the reaction is detected that the optical storage drive is turned over.

13. The method of claim 9 further comprising:
   (c) sounding an alarm when the reaction is detected that the optical storage drive is turned over.

14. The method of claim 9 further comprising:
   (d) outputting a warning signal when the reaction is detected that the optical storage drive is turned over.

* * * * *